United States Patent
Laor

[11] Patent Number: 5,168,535
[45] Date of Patent: Dec. 1, 1992

[54] INTEGRATED OPTIC SWITCH

[76] Inventor: Herzel Laor, 3774 Telluride Cir., Boulder, Colo. 80303

[21] Appl. No.: 750,834

[22] Filed: Aug. 27, 1991

Related U.S. Application Data

[63] Continuation-in-part of Ser. No. 301,617, Jan. 25, 1989, abandoned, which is a continuation of Ser. No. 812,956, Dec. 24, 1985, abandoned.

[51] Int. Cl.[5] .......................... G02B 6/26; G02B 6/42
[52] U.S. Cl. ...................................................... 385/16
[58] Field of Search ........................ 385/16, 24, 40, 49, 385/52

[56] References Cited

U.S. PATENT DOCUMENTS

| | | | |
|---|---|---|---|
| 3,990,780 | 11/1976 | Dakss | 350/96 C |
| 4,013,000 | 3/1977 | Kogelnik | 350/96 C |
| 4,148,556 | 3/1979 | Santer et al. | 350/96.13 |
| 4,175,827 | 11/1979 | McMahon | 385/16 |
| 4,394,060 | 7/1983 | Verber et al. | 350/96.13 |
| 4,425,024 | 1/1984 | Keil et al. | 350/96.14 |
| 4,491,384 | 1/1985 | Yamashita | 350/96.13 |
| 4,516,837 | 5/1985 | Soref et al. | 350/347 V |
| 4,715,680 | 12/1987 | Kawaguchi et al. | 385/16 |

OTHER PUBLICATIONS

Electrooptic Fresnel Lens-scanner with an Array of Channel Waveguides Author: K. Takizawa, Published by: Applied Optics, vol. 22, No. 16 Aug. 15, 1983; pp. 2468-2473.
High Speed Optical Time-Division and Space Division Switching Author: M. Sakaguchi; Published by: IOOC-ECOC Jan. 1985; pp. 81-88.

*Primary Examiner*—John D. Lee
*Assistant Examiner*—Robert E. Wise
*Attorney, Agent, or Firm*—Jansson & Shupe, Ltd.

[57] ABSTRACT

The improved integrated optic switch includes a thin film optical waveguide on a substrate. Each of one or more input optical fibers is coupled to the waveguide and propagates a wide angle beam of light along it. Two or more light receptors, each having an optical receptor fiber, are positioned in the path(s) of the beam(s). Each receptor includes a lens for focusing each beam to a "spot" of light and a transducer for aligning the spot and the receptor fiber. Any receptor fiber may thereby receive light from any beam of light and two or more receptor fibers may simultaneously receive light from any beam.

19 Claims, 4 Drawing Sheets

INTEGRATED OPTIC SWITCH

RELATED APPLICATIONS

This application is a continuation-in-part of application Ser. No. 301,617 filed on Jan. 25, 1989, and now abandoned, which in turn is a continuation of application Ser. No. 812,956 filed on Dec. 24, 1985, and now abandoned.

FIELD OF THE INVENTION this invention relates generally to fiber optics and, more particularly, to optic devices for switching fiber optic signals.

BACKGROUND OF THE INVENTION

Fiber optic technology has come into relatively wide usage which continues to expand. Fiber optics are used in such applications as telephone systems, digital data links, local area networks and, to a more limited degree, video transmission. Fiber optic technology also finds use in illumination, medical applications and displays. However, unlike the earlier-mentioned applications, these latter do not usually require switches to link different optical fibers with one another.

Switching of fiber optic signals has proven to be something of a significant technological hurdle. Indeed, the text *Understandinq Fiber Optics*, ©1987 by author Jeff Hecht and published by Howard W. Sams & Co., states that "optical-switching technology is difficult"- 'and ". . . optical switching is a major problem."

One type of optical switch is shown in U.S. Pat. No. 4,491,384 (Yamashita et al.) and uses a single laser beam coupled into a waveguide. Either or both of a pair of surface acoustic wave (SAW) transducers "operate"on the beam and the interaction of an SAW and the beam serves to direct the beam. Grating lenses further direct a beam and couple it to an optical coupler on the output side of the switch.

By selecting either one or both of two interdigital transducers (IDT) to produce an SAW and by selecting the frequency of the voltage applied to each IDT, the beam can be directed to any one of the couplers in sequence —but not to more than one simultaneously. For example (and as shown in FIG. 1), if only SAW2 is propagating, the beam follows path D to the center coupler. If only SAW1 is propagating, the beam follows path F to the lower coupler. If both SAW1 and SAW2 are propagating, the beam follows path E to the upper coupler. The diffraction angle(s) can be varied by selecting different IDT frequencies, presumably to direct the beam to yet other unillustrated couplers. In the Yamashita et al. embodiment shown in FIGS. 3-5, the input laser beam is split by waveguides to two beams and surface acoustic waves operate singly or in tandem on each beam.

In the second embodiment, two couplers can receive a single beam only by first splitting the beam. It appears that the number of output couplers which can receive a particular beam is equal to the number of "input beams," either one or, if the beam is split, two. To put it another way, it is not possible for more than two or all of the output couplers to simultaneously receive the same beam signal. Nor does the Yamashita et al. patent suggest whether control of the switching function is at the input side of the switch, at the output side or elsewhere. And each coupler is in the path of a beam only when that coupler is actually "receiving"the beam, i.e., in communication with it.

Another type of optical switch is shown in U.S. Pat. No. 3,990,780 (Dakss) and uses plural input and output waveguides and a separate "integrated beam deflection element"adjacent to each such waveguide. The element illustrated is an IDT to generate an SAW. No single input can be simultaneously received by plural outputs and each output is in the path of a light beam only when that output is actually receiving the beam. Two IDT's are required to "route"a single beam to a single output waveguide.

U.S. Pat. No. 4,394,060 (Verber et al.) shows a system for scanning or "sweeping"a light beam, presumably across some area. U.S. Pat. No. 4,013,000 (Kogelnik) shows an optical crossbar switching network in which two layers of parallel strip-like waveguides are arranged in an angular orientation one atop the other to provide a matrix of crossing points. Input light follows the strip along which it enters or, if couplers are actuated, is routed to the adjacent, angularly oriented strip. Switches of this type are known to require complex control systems and tend to be susceptible to "crosstalk."

Other types of optical switch devices are shown in U.S. Pat. Nos. 4,148,556 (Sauter et al.) and 4,425,024 (Keil et al.). The scanner device described in a paper titled "Electrooptic Fresnel Lens-scanner with an Array of Channel Waveguides"by K. Takizawa, published by *Applied Optics*. Vol 22, #16, Aug. 15, 1983, uses a number of "channel"waveguides having the same length but differing widths with respect to one side of a center line. The waveguides on the other side of the center line are arranged in mirror image. Varying values of DC voltage are applied to the structure to create an electric field used both for focusing and scanning. That is, it exhibits characteristics of a lens and of a scanner. FIG. 6, items (d) and (e) from a paper titled "High Speed Optical Time-Division and Space-Division Switching"by M. Sakaguchi et al. shows types of guided wave, directional coupler switches.

OBJECTS OF THE INVENTION

It is an object of the invention to overcome some of the problems and shortcomings of the prior art.

Another object of the invention is to provide an improved integrated optic switch by which two or more receiving users can monitor the same input signal simultaneously.

Still another object of the invention is to provide an improved integrated optic switch by which each of plural receiving users can select any of plural input signals for reception.

Another object of the invention is to provide an improved integrated optic switch in which a single transducer couples any one of several input signals to a receiving optical fiber.

How these and other objects are accomplished will become more apparent from the following detailed description taken in conjunction with the drawing.

SUMMARY OF THE INVENTION

The invention involves "integration"of optical (including fiber optical) and electrical components and a substrate to provide a switch by which plural light receptors may simultaneously receive light from a beam of light for digital fiber optic communication, data transmission or other purposes. The inventive switch has application where one or more optical fibers, somewhat analogous to transmitters, provide light "inputs" to the switch. Each such fiber carries a communication signal to be received by one, some or all receptors, each of which has a "receiver" fiber. Transmission of digitized data or other signal and detection of whether a light beam is present or absent are but two of dozens of examples of how optic switches are used to communicate.

The improved integrated optic switch includes a waveguide such as a thin film optical waveguide as may be made by depositing a layer of lithium niobate upon a substrate. Input means such as an input optical fiber propagates a beam of light along the waveguide. The switch also includes plural light receptors spaced from the input means and positioned in the path of the beam. Each receptor has an optical fiber and means for directing light into the fiber so that the receptor fibers may thereby simultaneously receive light from the beam.

In a highly preferred embodiment, each receptor includes a lens for concentrating a light beam to a spot and a transducer such as an interdigital transducer (IDT) for providing a surface acoustic wave aligning the spot and the receptor fiber to direct light into such fiber As used herein, "concentrate" and like terms means to focus and "spot" means a relatively small area of light as may result from focusing light from a beam of light.

While the input means may include only one input fiber, the switch has great utility in applications having plural input fibers, each of which propagates a light beam. Each receptor is in the path of each beam and thereby able to receive the signal of any beam—and more than one receptor can simultaneously receive the signal of a particular beam.

In switches using IDTs for aligning a spot and a receptor fiber, such alignment is by changing the locus or location of the spot to bring it to alignment with the fiber. Where the switch is used with plural light beams propagated along the waveguide, each lens concentrates each light beam to a different spot and alignment is achieved by changing the locus of a spot. The transducer has a characteristic which can be varied and the locus of a spot is changed by changing such characteristic. For example (and in the case of an IDT), the variable characteristic is frequency.

Discrete changes in the frequency of the voltage applied to the IDT will cause discrete shifts in the position of the spot. In a highly preferred embodiment (and in the case of plural light beams carrying, for example, television signals), the locus of all spots is changed simultaneously by changing such characteristic. To state it another way, changing the characteristic, e.g., frequency, of the signal applied to the transducer causes the spots to "index" or shift simultaneously so that the desired spot is brought to alignment with the receiving fiber, thereby coupling or "linking" the input fiber and a particular receiving fiber.

As explained above, each receptor is spaced from the input means and includes a fiber, a lens and a transducer. In a highly preferred embodiment, the transducer is between the lens and the fiber and is of the surface acoustic wave type. However, the transducer may alternatively be between the input means and the lens.

In another embodiment—and recognizing that each lens concentrates each light beam to a different spot—the spots are stationary and a spot and the fiber are aligned by changing the locus of the fiber. An example of this embodiment involves an electric "motor" of some type to manipulate the position of a fiber. If fiber position is a function of the magnitude of the voltage applied to the motor, varying such voltage characteristic changes the fiber position until it is aligned with the desired spot.

The input means includes one or more optical fibers spaced along the first or "input" edge of the waveguide and butt connected thereto for introducing light into the waveguide. A beam of light so introduced will be fan-shaped in a relatively "wide angle" but will have somewhat greater intensity at and near the center axis of the beam than toward its outer extremities. If one or more receptors are positioned adjacent to such extremities, the resultant signal strength may be marginal or even insufficient for good communication between an input fiber and such receptors. Accordingly, a highly preferred embodiment includes an input lens adjacent to each input fiber to provide a light beam (or beams, in the case of plural input fibers) of more uniform intensity.

As light propagates through each fan-shaped path, it will be attenuated (or incrementally "lost"). In other words, longer light paths result in less intense light beams because of light "losses" along the path. From the drawing and the detailed description, it will be appreciated that the distance from an input fiber to a receptor positioned along the center axis of the path will be less than the distance from such fiber to a receptor at the outer extremity of the "fan." Communication with a latter receptor may be marginal or unacceptable if light losses become too great. Therefore, it is preferred to generally equalize the length of all light paths, i.e., the distance travelled by light within the fan-shaped light path and along its outer boundaries.

A way to do so is to "aim" each light beam at the center of the receptors. Two or more receptors define a group having a nominal center midway between those receptors at the group ends. Each light beam has a nominal "mid-axis," i.e., an axis coextensive with the longitudinal axis of the input fiber emitting that beam. The aforementioned aiming is by orienting an input fiber until the mid-axis of its light beam is generally coincident with the group center.

A significant advantage of the new switch is that it can be applied in situations where the user of a receiver coupled to a receptor fiber wishes to have the capability of monitoring a light signal from any input fiber. Accordingly, a preferred embodiment of the invention also includes a user-operated transducer controller for selecting a light beam to be monitored. Further details of the invention are set forth in the drawing and the following detailed description

DETAILED DESCRIPTION OF PREFERRED EMBODIMENTS

Figure 1B:
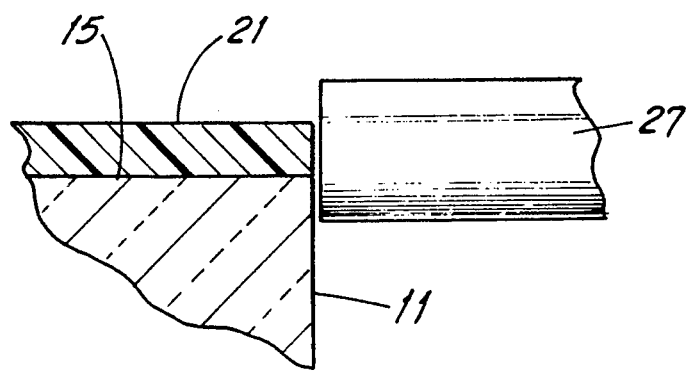
FIG. 1B is side elevation view, greatly enlarged, of the circled portion of the structure of FIGURE 1A.
Figure 1A:
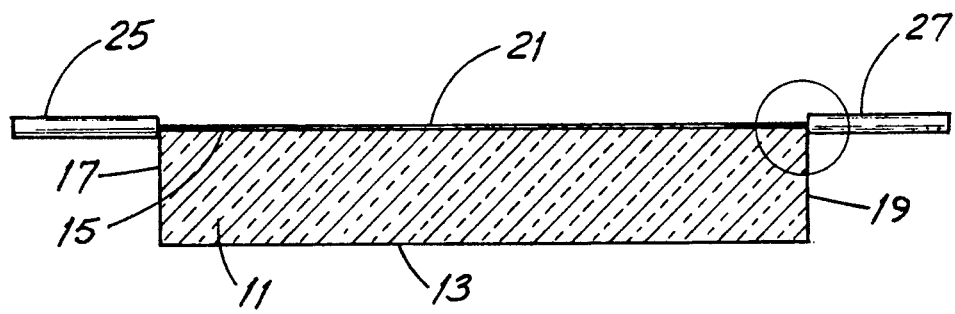
FIG 1A is a side elevation view of the substrate and waveguide portions of the invention together with optical fibers coupled thereto.
Figure 2:
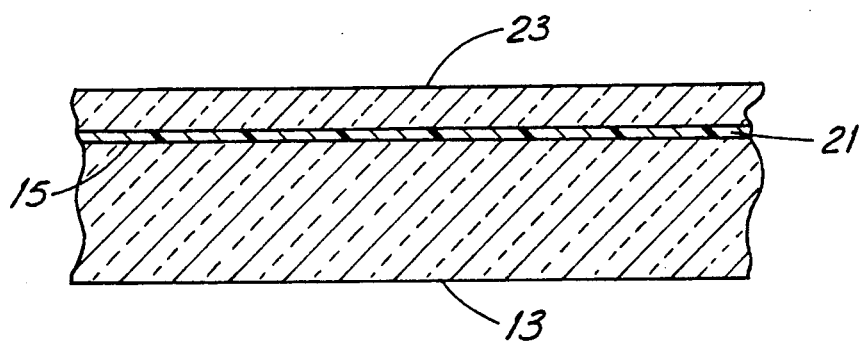
FIG. 2 is a side elevation view, with parts broken away, that of FIG. 1A and showing the substrate, waveguide and a superstratum atop the waveguide.

For improved ease of understanding, the inventive switch 10 will be explained "building block" fashion in which certain individual components, not necessarily novel in and of themselves, are explained and then brought together in the switch. Referring first to FIGS. 1A and 1B, the switch 10 includes a "platform" or substrate 11 of silicon, glass or ceramic, for example. Such substrate 11 has a bottom surface 13, a generally planar top surface 15, an input edge 17 and a receptor edge 19. A thin-film optical waveguide 21 of thermally-diffused titanium, lithium niobate crystal, silicon nitride or tantalum pentoxide is formed on the top surface 15. In the alternative, the waveguide 21 may be formed between the substrate 11 and a superstratum 23 as shown in FIG. 2. In either configuration, the substrate 11 and superstratum 23 have an index of refraction lower than that of the waveguide 21 so that light does not escape the waveguide 21 but, rather, propagates through it.

In the configuration of FIGS. 1A and 1B, air above the waveguide 21 has an index of refraction lower than that of the waveguide 21 with the same "light-capturing" result. Such waveguide 21 has a thickness on the order of a few microns and its actual thickness and the diameters of the cores of the input fibers 25 and receptor fibers 27 described below are selected to be about equal to one another.

Figure 3:
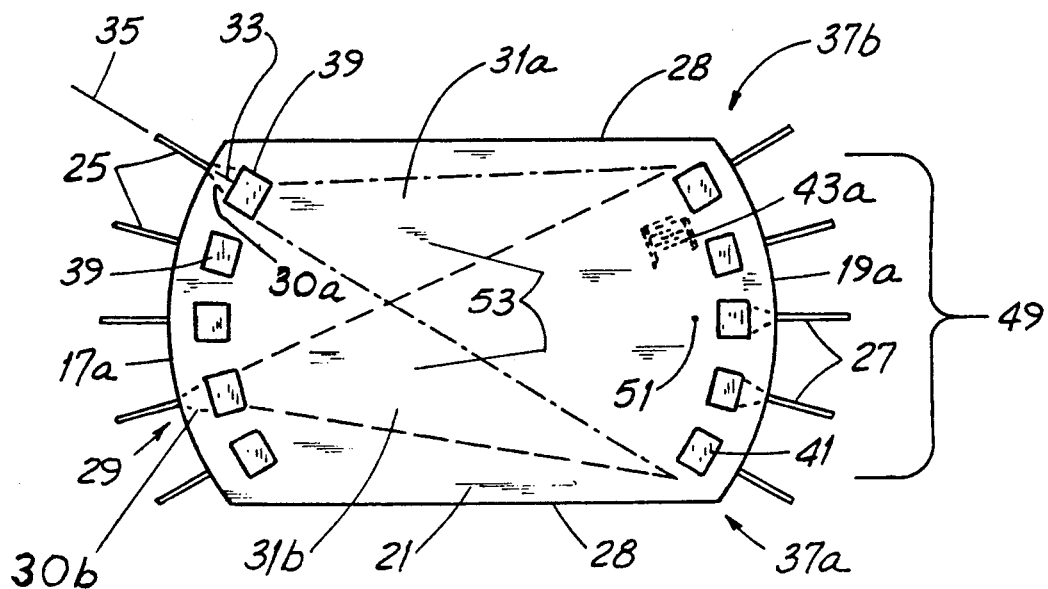
FIG. 3 is a top plan view of one embodiment of the invention with a portion shown in dotted outline and with light beams represented by dashed boundaries.
Figure 4:
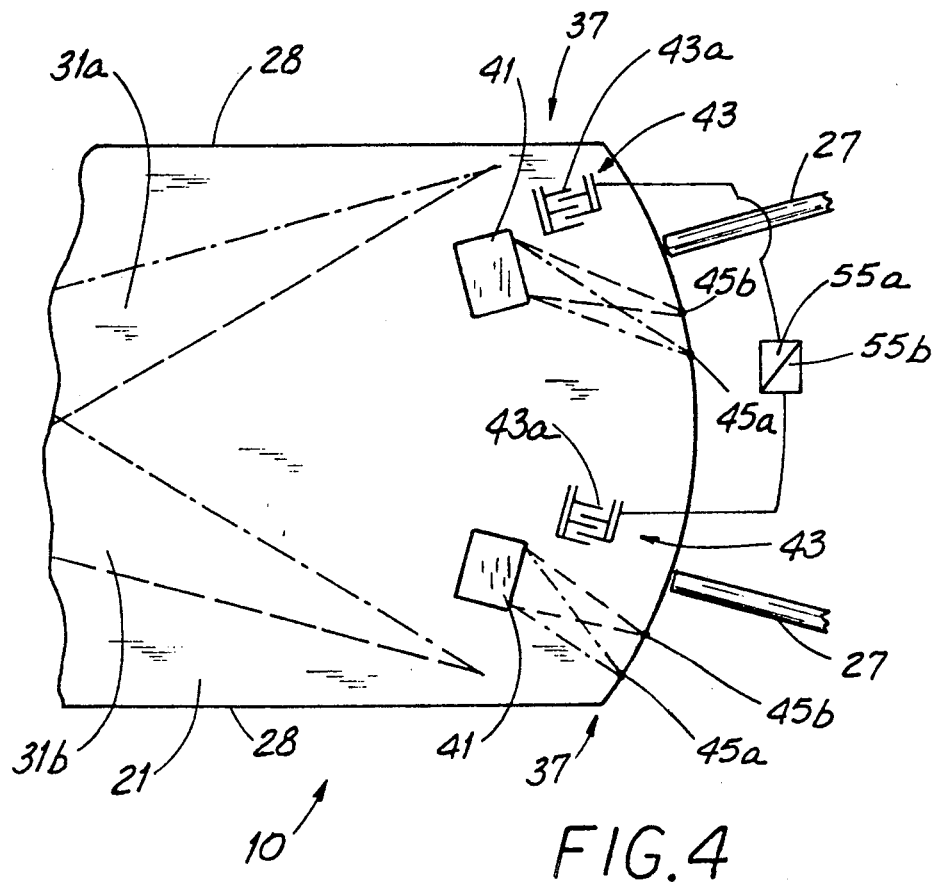
FIG. 4 is a top plan view, greatly enlarged and with parts broken away, of a portion of the invention shown in FIG. 3 and further showing a transducer controller.
Figure 5:
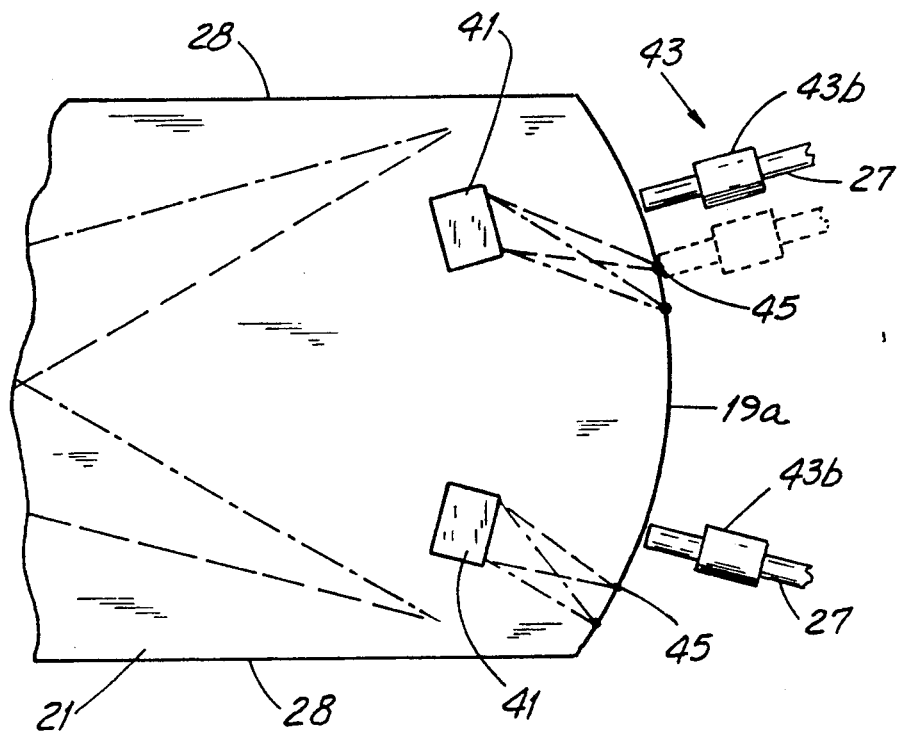
FIG. 5 is a top plan view, greatly enlarged and with parts broken away, similar to that of FIG. 3 but in a second embodiment.
Figure 6:
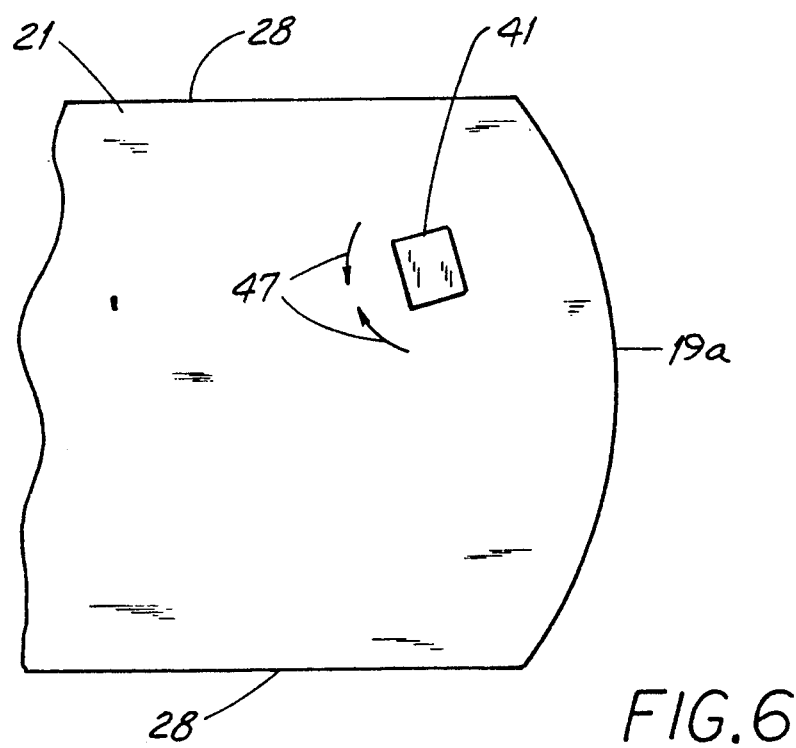

In FIGS. 3-5, the substrate 11 is shown to have a curved input edge 17 and a curved receptor or output edge 19. This is so since substrates like substrate 11 are often made using a circular blank from which two parallel sides 28 are "slabbed off" to provide the shape shown in FIG. 3. Other substrate shapes, e.g., rectangular, may be used.

Referring additionally to FIG. 3, input means 29 including an input optical fiber 25 is mounted along the first or "input" edge 17a of the waveguide 21 and connected thereto by butt connection, for example. The fiber 25 introduces light into the waveguide 21 and thereby propagates a beam of light along the waveguide 21 toward the receptor edge 19a of waveguide 21. A beam of light so introduced will be fan-shaped in a relatively wide angle.

While the input means 29 may include only one input fiber 25, the switch 10 has great utility in applications having plural input fibers 25 spaced along the input edge 17a. Each such fiber 25 propagates a wide angle light beam toward the receptor or output edge 19a. For clarity of explanation, only two light beams 31a, 31b are shown in FIGS. 3, 4 and 5. Beam 31a is defined by dash-dot lines while beam 31b is defined by dashed lines. Materials and techniques for making such substrates 11 and waveguides 21 and for coupling optical fibers 25, 27 to waveguides are known in the art and materials are not necessarily limited to those mentioned above.

The fan-shaped wide angle beam of light (like beams 30a, 30b) introduced by each input fiber 25 tends to have a greater light intensity near its central axis 33, generally coincident with the axis 35 of the fiber 25, and less intensity toward its extremities. In FIG. 3, it will be noted that the receptors 37a and 37b are positioned adjacent to the extremities of the beams. If it is assumed that such beams are "unimproved" beams 30a, 30b, the resultant signal strength may be marginal or even insufficient for good communication between an input fiber 25 and such receptors 37a, 37b. Therefore, a highly preferred embodiment includes an input lens 39 adjacent to each input fiber 25. Such lens 39 provides an "improved" light beam (or beams, in the case of plural input fibers) of more uniform intensity.

The construction and characteristics of such a lens 39 (and of the output lens 41 described below) are known and an example thereof is described in a paper titled "Design of Thin-film Luneburg Lenses for Maximum Focal Length Control" by Ettore Colombini and published in *Applied Optics*, Vol. 20, #20, Oct. 15, 1981. Other lenses are described in a paper titled "Integrated Lenses on Silicon Nitride Waveguides" by P. Gidon et al., published in *Optical Engineering*, Vol. 24, #2, Mar./Apr. 1985 and in the Takizawa paper cited above. The foregoing papers are incorporated herein by reference.

Referring further to FIG. 3 and additionally to FIG. 4, the switch 10 also includes plural light receptors 37 spaced from the input means 29 and positioned along the receptor edge 19a in the path(s) of the beam(s) 31. Each receptor 37 has an optical fiber 27 and means 43 for directing light into the fiber 27 so that the receptor fibers 27 may thereby simultaneously receive light from any beam 31.

In a highly preferred embodiment, each receptor 37 includes a lens 41 for concentrating a light beam 31 to a spot 45 and a transducer 43a such as an interdigital transducer (IDT) for providing a surface acoustic wave aligning the spot 45 and the receptor fiber 27 to direct light into such fiber 27. Explanation of this arrangement is by particular reference to FIG. 4.

For purposes of this explanation, it is assumed that the input means 29 includes only two input fibers 25 and that, therefore, two beams of light 31a, 31b are propagated along the waveguide 21. As noted above, the boundaries of the beam 31a are marked by dashed lines while the boundaries of the beam 31a are marked by dash-dot lines. It is also assumed there are only two receptors 37, each positioned in the path of each beam 31a, 31b and thereby capable of simultaneously receiving the signals of each beam 31a and 31b. It is to be appreciated that more than one receptor 37 can simultaneously receive the signal of a particular beam 31a, 31b. It is also assumed that the IDT 43a is not activated. The upper lens 41, illustrated as a focusing lens, concentrates light from the beam 31a to the spot 45a and light from the beam 31b to the spot 45b. Similarly, the lower lens 41, illustrated as a focusing lens providing converging rays of light, concentrates light from the beam 31a to the spot 45a and light from the beam 31b to the spot 45b. None of the spots 45a, 45b and fibers 27 are yet aligned with one another and one way in which such alignment is made to occur will now be explained.

In switches 10 using IDTs for aligning a spot 45 and a receptor fiber 27, such alignment is by changing the locus or location of the spot 45 to bring it to alignment with the fiber 27. The transducer 43a has a characteristic which can be varied and the locus of a spot 45 (or of plural spots 45a, 45b in the illustration of FIG. 4) is changed by changing such characteristic. In the case of an IDT, the variable characteristic is frequency.

Discrete changes in the frequency of the voltage applied to the IDT 43a will cause discrete shifts in the position of the spots 45a, 45b. In a highly preferred embodiment, the loci of all spots 45 associated with a particular receptor 37 are changed simultaneously by changing such characteristic. To state it another way, changing the characteristic, e.g., frequency, of the signal applied to the transducer 43a causes the spots 45 to "index"or shift simultaneously so that the desired spot 45 is brought to alignment with the receiving fiber 27, thereby coupling or "linking"an input fiber 25 and a particular receiving fiber 27.

With that explanation in mind, it is assumed that the upper IDT 43a is activated at a predetermined frequency. With respect to the upper receptor 37, the spots 45a, 45b simultaneously index upward and it is assumed that the frequency is selected to align the spot 45b with the core of the upper fiber 27. Communication is thereby established between the beam 31b and the upper fiber 27. If the input fibers 25 are spaced equidistant apart, the spots 45 will likewise be equidistant from one another. It is also to be noted that the spot 45a is now nominally at the position earlier occupied by the spot 45b—but the spot 45a is not yet aligned with the fiber.

It is now assumed that the user of the switch 10 (and, particularly, of a receiving station connected to the upper receptor fiber 27) wishes to establish communication with the input fiber 25 propagating the beam 31a. To that end, a voltage of another predetermined frequency is applied to the IDT 43a. The spots 45 index further upward to align the spot 45a and the upper fiber 27, thereby establishing such communication. Other receptors 37 operate similarly.

Considering next the embodiment shown in FIG. 5, and recognizing that each lens 41 concentrates each light beam 31 to a different spot, the spots 45 are stationary and a spot 45 and fiber 27 are aligned by changing the locus of the fiber 27 rather than that of a spot 45. An example of this embodiment involves a transducer 43b including an electric "motor"of a type to manipulate the position of a fiber 27. If fiber position is a function of the magnitude of the voltage applied to the transducer 43b, varying such voltage characteristic changes the fiber position (as shown in dotted outline) until it is aligned with the desired spot 45.

In a third embodiment of the switch 10, spot-fiber alignment is by using a waveguide and applied voltage arrangement such as is shown and described in the Takizawa paper cited above.

In practice, the number of input fibers 25, receptors 37 and receptor fibers 27 may number in the dozens if not hundreds. And the number of input fibers 25 and the number of receptors 37 need not correspond. From the foregoing, it is now apparent that a user of a receiving station connected to any receptor fiber 27 can select any input fiber 25 from which a signal is received. It is also apparent that multiple users can simultaneously select a particular input fiber 25 from which a signal is received since each receptor 37 includes its own individually-controllable means 43 for directing light to a fiber 27. An example of an application for the switch 10 is in command and control stations where a receiving user may wish to monitor any one of several radar signals and/or any of several security cameras. An application similar to the latter involves CATV networks where each of the signals "transmitted"by the input means 29 must be available for selection by each receiving subscriber.

As explained above, each receptor 37 is spaced from the input means 29 and includes a fiber 27, a lens 41 and a transducer 43. In the preferred embodiment shown in FIG. 4, the transducer 43 is between the lens 41 and the fiber 27 and is of the surface acoustic wave type. However, such transducer position may alternatively be between the input means 29 and the lens 41 as shown by the transducer 43a outline in FIG. 3. And, of force, a single structure may function as both a lens and spot-aligning mechanism as taught by the Takizawa paper in *Applied Optics* noted above.

It is to be appreciated that light is attenuated (or incrementally "lost") as it propagates through each fan-shaped path. And in general and for a given waveguide 21, the amount of light lost is a function of the length of the path travelled. Therefore, it is preferred to generally equalize the length of all light paths, i.e., the distance travelled by light along any straight line path within the fan-shaped beam 31.

Referring to FIG. 3, a way to do so is to "aim"each light beam 31 at the center of the receptors 37. Two or more receptors define a group 49 having a nominal center 51 midway between those receptors 37a, 37b at the group ends. Aiming is by orienting an input fiber 25 (and if necessary, lens 39) until a line 53 bisecting the fan-shaped path is generally coincident with the group center 51.

As noted above, a significant advantage of the new switch 10 is that it can be applied in situations where the user of a receiver coupled to a receptor fiber 27 wishes to have the capability of monitoring a light signal from any input fiber 25. Accordingly, a preferred embodiment of the inventive switch 10 shown in FIG. 4 also includes a plurality of user-operated transducer controllers such as controllers 55a, 55b for selecting a light beam 31 to be monitored.

While the principles of the invention have been described in connection with specific embodiments, those of ordinary skill in the art will recognize other embodiments that are within the scope of the invention.

I claim:

1. An improved integrated optic switch including:
   a waveguide;
   input means for propagating at least one beam along the waveguide;
   plural light receptors simultaneously receiving the light beam, each receptor having an optical fiber;
   each receptor including means or directing light into the fiber,
   whereby the fibers may simultaneously receive the light beam.

2. The switch of claim 1 wherein each receptor further includes a lens for concentrating a light beam to a spot and a transducer for aligning the spot and the fiber, thereby receiving light into the fiber.

3. The switch of claim 2 wherein the input means propagates plural light beams and each receptor is in the path of each beam.

4. The switch of claim 3 wherein each lens concentrates each light beam to a different spot and wherein a spot and the fiber are aligned by changing the locus of such spot.

5. The switch of claim 4 wherein the transducer has a variable characteristic and the locus of a spot is changed by changing such characteristic.

6. The switch of claim 5 wherein the locus of all spots is changed simultaneously by changing such characteristic.

7. The switch of claim 3 wherein the transducer is between the lens and the fiber and is of the surface acoustic wave type.

8. The switch of claim 3 wherein the transducer is between the input means and the lens and is of the surface acoustic wave type.

9. The switch of claim 3 wherein each lens concentrates each light beam to a different spot and wherein a spot and the fiber are aligned by changing the locus of the fiber.

10. The switch of claim 9 wherein the transducer has a variable characteristic and the locus of the fiber is changed by changing such characteristic.

11. The switch of claim 3 wherein the input means includes plural optical fibers for introducing light into the waveguide and an input lens for each fiber, thereby providing plural beams of light of more uniform intensity.

12. The switch o claim 2 wherein the spot and the fiber are aligned by changing the locus of the spot.

13. The switch of claim 1 wherein the input means includes an optical fiber for introducing light into the waveguide and an input lens providing a light beam of more uniform intensity.

14. The switch of claim 1 wherein the input means propagates plural light beams, each light beam is along a path to the receptors and the input means and receptors are arranged to generally equalize the length of all paths.

15. An improved integrated optic switch including:
a waveguide;
input means for propagating at least one light beam along the waveguide;
plural light receptors simultaneously receiving the light beam, each receptor having an optical fiber and means for concentrating a light beam to a spot;
each receptor also including means for selectively aligning the spot with the fiber,
whereby the fibers may simultaneously receive the light beam.

16. The switch of claim 15 wherein each receptor further includes a lends for concentrating a light beam to a spot and a transducer for aligning the spot and the fiber, thereby receiving light into the fiber.

17. The switch o claim 16 wherein the input means propagates plural light beam and each receptor is in the path of each beam.

18. The switch of claim 17 wherein each lens concentrates each light beam to a different spot and wherein a spot and a fiber are aligned by changing the locus of the fiber.

19. The switch of claim 16 wherein the spot and the fiber are aligned by changing the locus of the spot.

* * * * *

UNITED STATES PATENT AND TRADEMARK OFFICE
CERTIFICATE OF CORRECTION

PATENT NO. : 5,168,535

DATED : December 1, 1992

INVENTOR(S) : Herzel Laor

It is certified that error appears in the above-identified patent and that said Letters Patent is hereby corrected as shown below:

In column 1, line 13, delete "this" and insert --This--.

In column 1, line 30, delete ""optical-switching technology is difficult'-'" and insert --"[o]ptical-switching technology is difficult"--.

In column 3, line 25, after "fiber" insert a --.--.

In column 4, line 64, after "away" insert --similar to--.

UNITED STATES PATENT AND TRADEMARK OFFICE
CERTIFICATE OF CORRECTION

PATENT NO. : 5,168,535  
DATED : December 1, 1992  
INVENTOR(S) : Herzel Laor It is certified that error appears in the above-identified patent and that said Letters Patent is hereby corrected as shown below:

```
In column 8, line 10, delete "force" and insert --course--.

In column 8, line 47, after "one" insert --light--.

In column 9, line 22, delete "o" and insert --of--.

In column 10, line 17, delete "lends" and insert --lens--.

In column 10, line 20, delete "o" and insert --of--.

In column 10, line 21, delete "beam" and insert --beams--.
```

Signed and Sealed this

Sixteenth Day of November, 1993

Attest:

BRUCE LEHMAN

*Attesting Officer*       *Commissioner of Patents and Trademarks*